(12) United States Patent
Chang

(10) Patent No.: US 8,405,529 B2
(45) Date of Patent: Mar. 26, 2013

(54) USING BUS INVERSION TO REDUCE SIMULTANEOUS SIGNAL SWITCHING

(75) Inventor: Chih-Hsien Chang, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 87 days.

(21) Appl. No.: 13/045,762

(22) Filed: Mar. 11, 2011

(65) Prior Publication Data
US 2012/0229310 A1   Sep. 13, 2012

(51) Int. Cl.
*H03M 5/00*   (2006.01)

(52) U.S. Cl. ............................................. 341/55; 341/56

(58) Field of Classification Search ..................... 341/55, 341/56; 375/257; 714/752; 710/105
See application file for complete search history.

(56) References Cited

U.S. PATENT DOCUMENTS

| 7,869,525 B2 * | 1/2011 | Macri et al. ................... 375/257 |
| 2009/0313521 A1 * | 12/2009 | Hollis ........................... 714/752 |

OTHER PUBLICATIONS

Jedec Standard, "Stub Series Terminated Logic for 1.8 V (SSTL_18)," JESD8-15, Addendum 15 to JESD8 Series, Oct. 2002, JEDEC Solid State Technology Association, 17 pages.
Altera, "Interfacing DDR2 SDRAM with Stratix II Devices," AN-328-1.0, ver 1.0, Feb. 2004, Altera Corporation, 20 pages.

* cited by examiner

*Primary Examiner* — Joseph Lauture
(74) *Attorney, Agent, or Firm* — Slater & Matsil, L.L.P.

(57) ABSTRACT

A method includes receiving a first plurality of parallel data; generating a first plurality of encoded data, with each of the first plurality of encoded data same as a respective one of the first plurality of parallel data; and transmitting the first plurality of encoded data simultaneously to a plurality of parallel bus lines, with each of the first plurality of encoded data transmitted by a respective one of the plurality of parallel bus lines. The method further includes receiving a second plurality of parallel data; generating a second plurality of encoded data, with each of the second plurality of encoded data inverted from a respective one of the second plurality of parallel data; and transmitting the second plurality of encoded data simultaneously to the plurality of parallel bus lines, with each of the second plurality of encoded data transmitted by a respective one of the plurality of parallel bus lines.

19 Claims, 5 Drawing Sheets

USING BUS INVERSION TO REDUCE SIMULTANEOUS SIGNAL SWITCHING

BACKGROUND

For parallel bus transmission, in which a plurality of parallel bus lines is used to transmit signals simultaneously, Simultaneous Switching Output (SSO) occurs. Signal integrity in SSO, however, may be degraded because of the power and ground noise generated during data transition. When data are toggled, that is, the signals on the parallel bus lines are switched between "0" and "1," the transited current passes through parasitic inductors and generates the power and ground noise. Parasitic inductors are generally from the packages in which the parallel bus lines are located.

In 2.5-dimensional (2.5D) or 3-dimensional (3D) integrated circuits, the amount of parallel data bus lines has increased from tens to thousands of lines. With the increase in the amount of simultaneous data bus transition, the signal degradation in SSO becomes more severe. Power consumption is also higher.

In previous solutions for reducing the power and ground noise, more power and ground inputs/outputs (I/Os) were used to reduce the parasitic inductance of the packages. More power and ground I/Os, however, result in increased chip area. For high-volume data bus with many bus lines, such chip area increase is sometimes unacceptable.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative, and do not limit the scope of the disclosure.

A method for reducing simultaneous output switching of signals and the circuit for performing the same are provided in accordance with an embodiment. The variations and the operation of the embodiment are then discussed. Throughout the various views and illustrative embodiments, like reference numbers are used to designate like elements.

Figure 1:
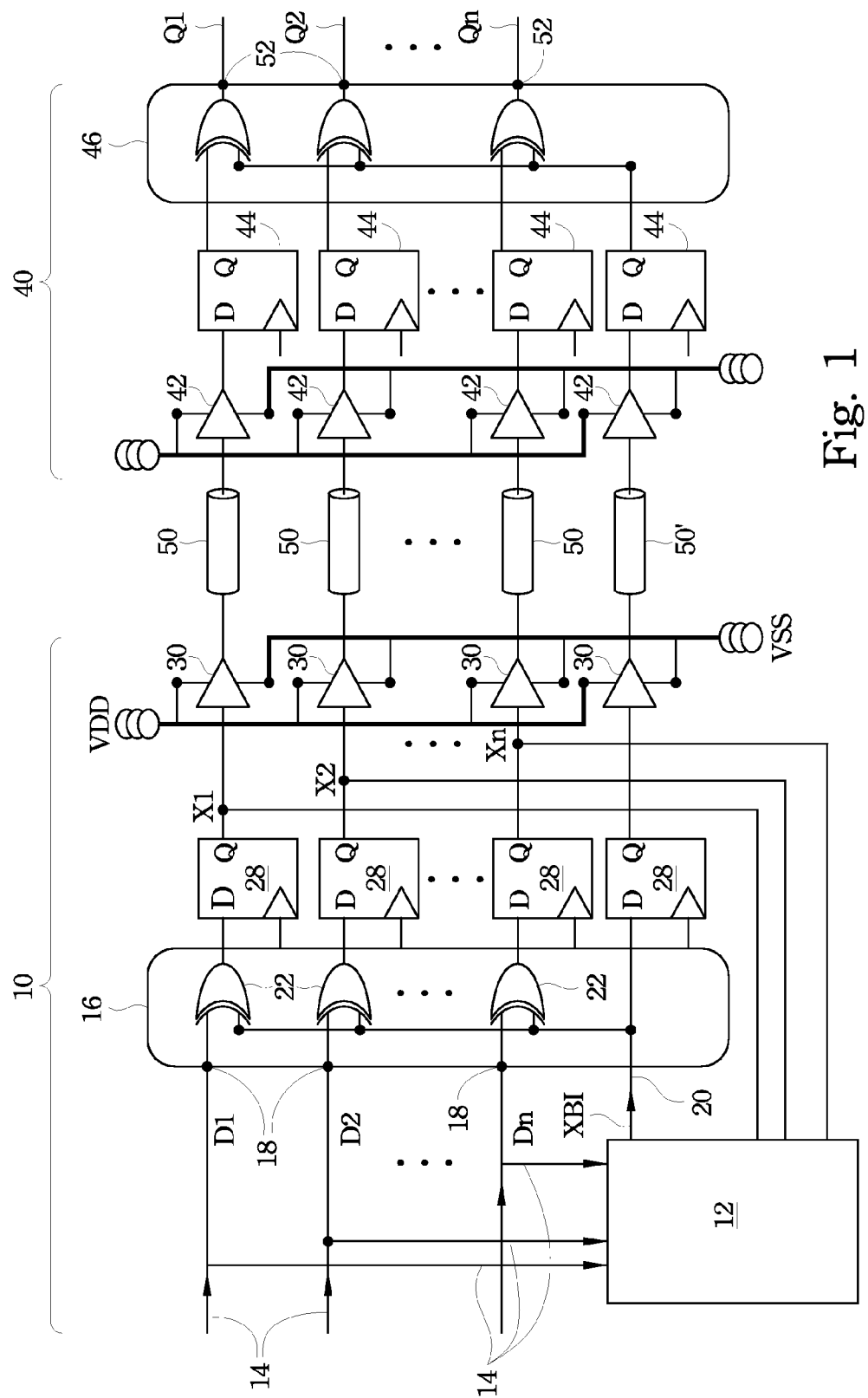
FIG. 1 illustrates a circuit diagram of a parallel bus system, in accordance with some embodiments.

FIG. 1 illustrates a block diagram of a parallel bus system in accordance with an embodiment. Parallel data D1 through Dn (with n being an integer) are received from parallel lines 14, and are to be transmitted from transmitter 10 to receiver 40 through parallel bus (transmission) lines 50. Each of parallel lines 14 carries one of parallel data D1 through Dn. In some embodiments, transmitter 10 and receiver 40 are located on a same printed circuit board (PCB), and transmission lines 50 are formed in the dielectric materials (such as FR4) of the PCB. In alternative embodiments, transmitter 10 and receiver 40 are remotely located, and are not on the same PCB.

Figure 2:
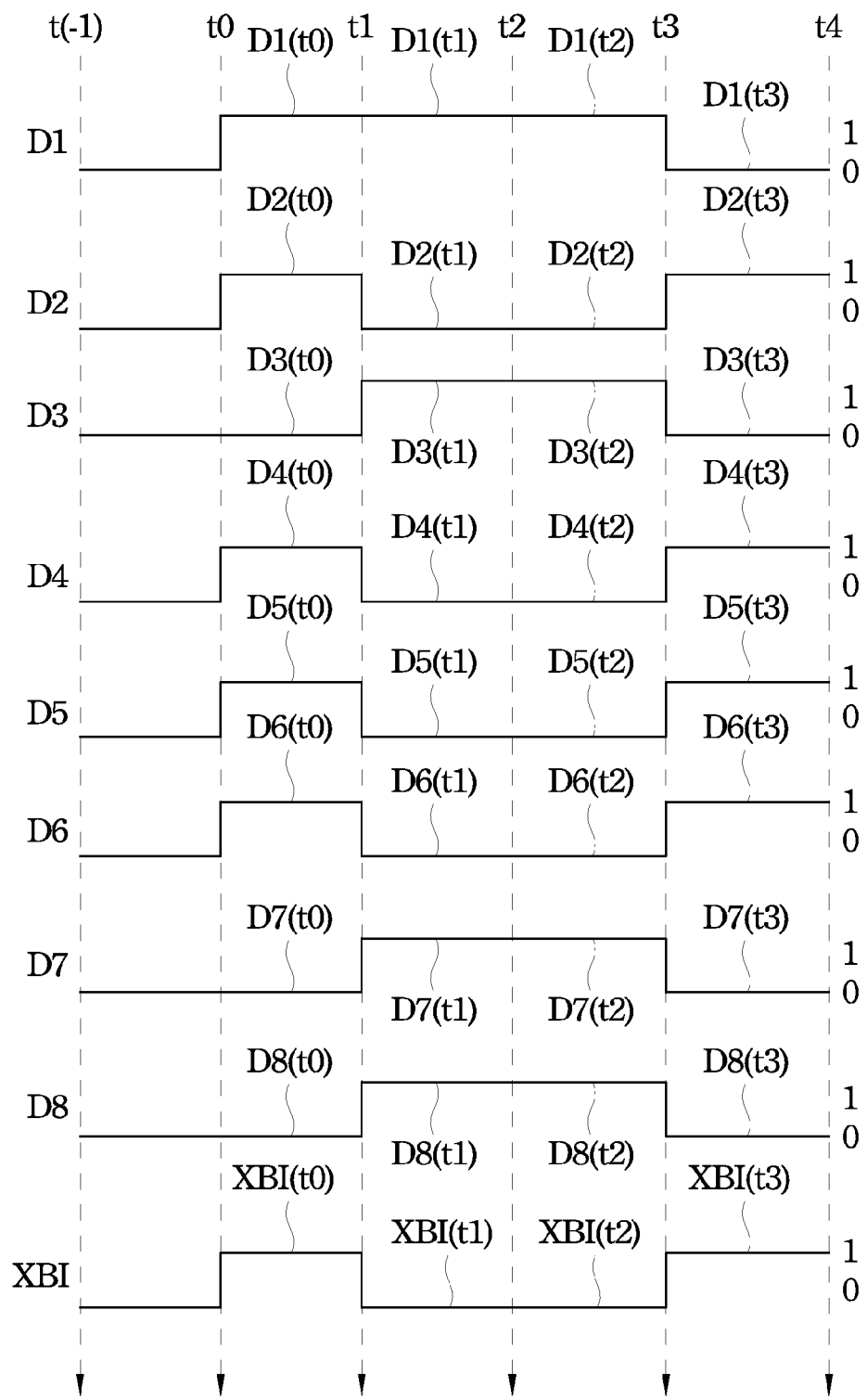
FIG. 2 illustrates a time sequence diagram of parallel data intended to be transmitted from a transmitter to a receiver and a bus inversion signal generated from the parallel data, in accordance with some embodiments.
Figure 3:
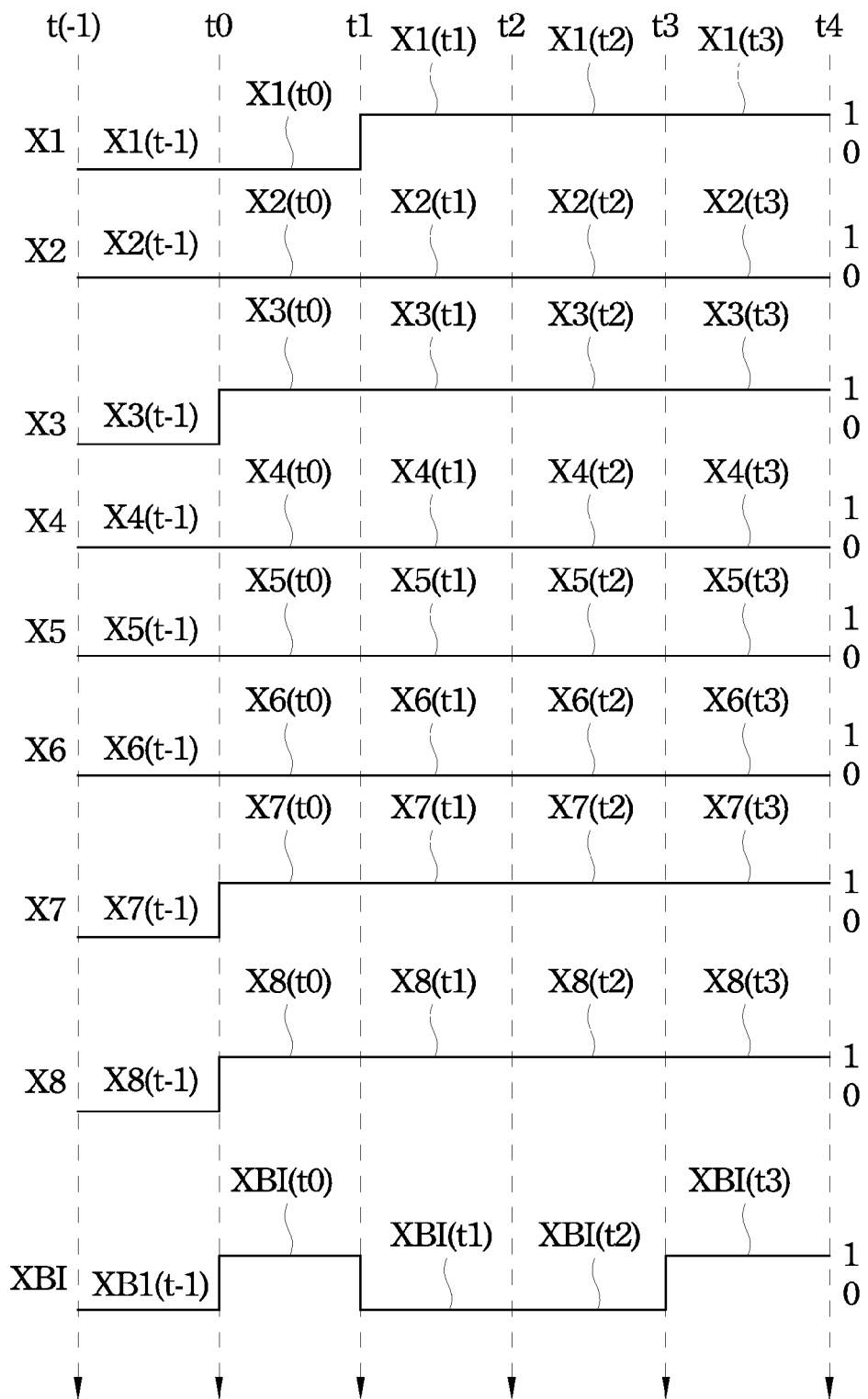
FIG. 3 illustrates a time sequence diagram of encoded data that are actually transmitted from a transmitter to a receiver and the respective bus inversion signal, in accordance with some embodiments.
Figure 4:
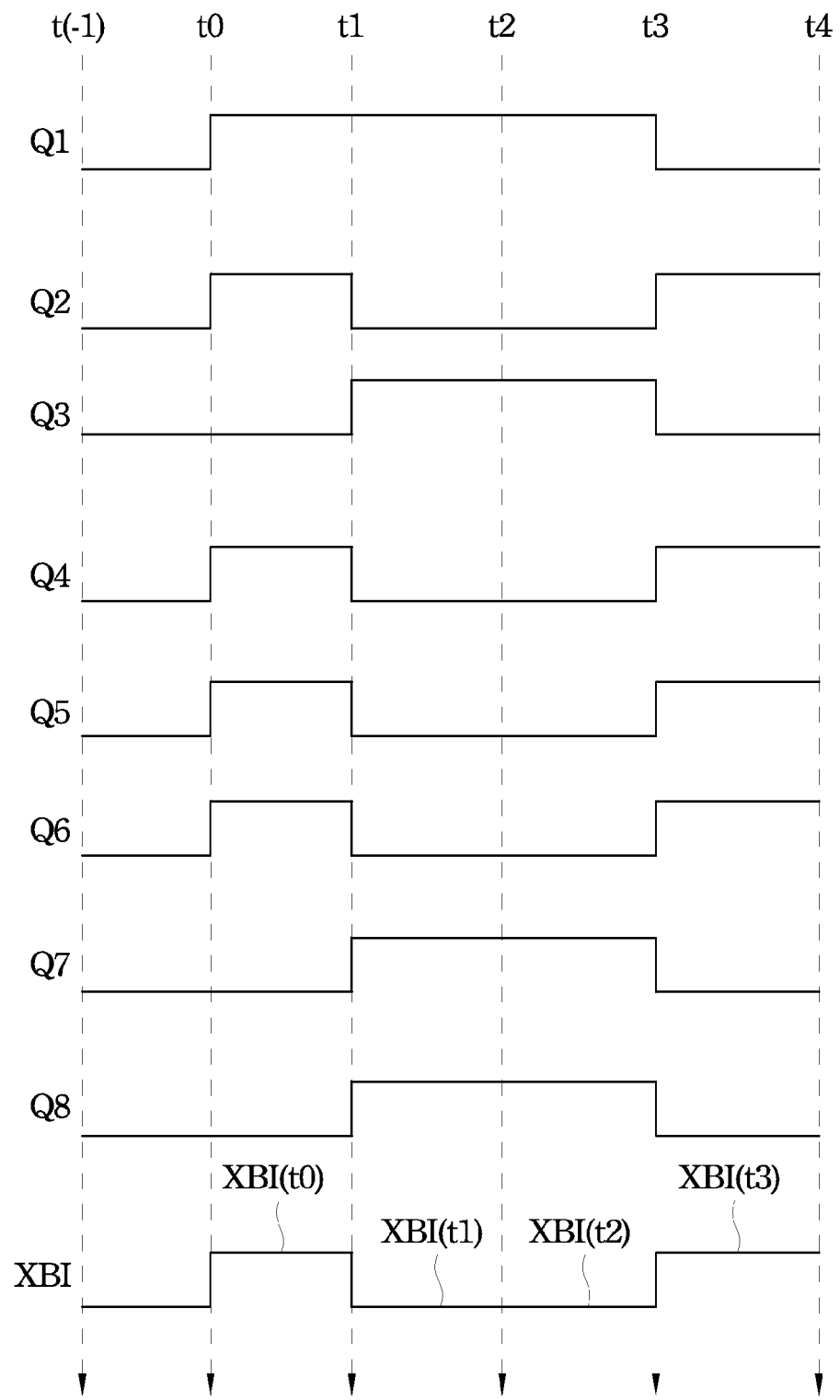
FIG. 4 illustrates a time sequence diagram of the data restored from the encoded data and the respective bus inversion signal, in accordance with some embodiments.

FIGS. 2, 3, and 4 illustrate the exemplary time sequence diagrams of various signals in the parallel bus system in accordance with an embodiment. In the illustrated example, the total number n of parallel lines 14 and parallel bus lines 50 is 8. Accordingly, 8 bits are transmitted in each clock cycle. It is realized, however, that the actual number of parallel bus lines 50 may be greater or smaller than 8. In some embodiments, the total number of parallel bus lines 50 may be greater than a hundred or over a thousand.

Parallel data D1 through D8 as shown in FIG. 2 are the signals received by transmitter 10 from parallel lines 14, and are the signals to be transmitted to receiver 40. Throughout the description, each of the data D1 through D8 may be postfixed with a symbol (which symbol is further included in parenthesis) representing a time point to indicate that the data is at the time slot (clock cycle) immediately after the respective time point. For example, parallel data D1(t0) represents the data D1 in the clock cycle immediately after time point t0, and hence is the data between time points t0 and t1. In an embodiment, parallel data D1 through D8 are not transmitted directly. Instead, parallel data D1 through D8 are encoded to generate encoded data X1 through X8, respectively, as shown in FIG. 3, and encoded data X1 through X8 are the signals transmitted on parallel bus lines 50 in FIG. 1. In some clock cycles, such as clock cycle t1-t2 and clock cycle t2-t3, encoded data X1 and X8 are the same as the respective parallel data D1 through D8 in the corresponding clock cycle. For example, X1(t1) is equal to D1(t1), and X8(t1) is equal to D8(t1). In remaining clock cycles such as clock cycle t0-t1 and clock cycle t3-t4, encoded data X1 and X8 are generated by inverting corresponding parallel data D1 through D8 in the respective clock cycles, respectively. For example, X1(t0) is equal to the inversion of D1(t0), and X8(t0) is equal to the inversion of D8(t0).

Bus inversion signal XBI is generated to indicate whether encoded data X1 and X8 are the same as, or are inverted from, the corresponding parallel data D1 through D8. In the illustrated example, if bus inversion signal XBI is "0" (false), the respective encoded data X1 through X8 are the same as parallel data D1 through D8, respectively. Otherwise, if bus inversion signal XBI is "1" (true), the respective encoded data X1 through X8 are inverted from parallel data D1 through D8, respectively. In alternative embodiments, value "0" of bus inversion signal XBI may represent the inversion of signals, while value "1" of bus inversion signal XBI may represent that signals are not inverted.

Since encoded data X1 through X8 are the data transmitted on parallel bus lines 50, to minimize the number of data toggling on parallel bus lines 50, each time parallel data D1 through D8 are received, respective parallel data D1 through D8 are compared to the corresponding encoded data X1 through X8 in the previous clock cycle. The comparison results indicate the number of parallel bus lines 50 that will have data toggling if parallel data D1 through D8 are transmitted without being inverted. If less than a half of data toggle, parallel data D1 through D8 can be transmitted without being inverted, and hence encoded data X1 through X8 are the same as respective parallel data D1 through D8. In some embodiments, bus inversion signal XBI is also set to "0." Otherwise, if more than a half of data toggle, each of parallel data D1 through D8 is inverted to generate the respective encoded data X1 through X8, and bus inversion signal XBI is set to "1." Accordingly, by transferring 8 encoded data X1 through X8, which are inverted from parallel data, the number of data toggling on parallel bus lines 50 is reduced to at most 4, which is half of 8.

FIGS. 2 through 4 illustrate exemplary time sequence diagrams for explaining the concept of the embodiments. Referring to FIG. 2, time points t(−1), t0, t1, t2, t3, and t4 separate neighboring clock cycles, and are when signal D1 through D8 may toggle. Assuming that all signals X1(t−1) through X8(t−1) are "0" during the time slot before time point t0. At time point t0, data D1, D2, and D4-D6 on parallel lines 14 toggle, while remaining data D3, D7, and D8 on parallel lines 14 do not toggle. Parallel data D1(t0) through D8(t0) are compared to the respective encoded data X1(t−1) through X8(t−1). Since more than a half (in this example, 5) of data X1 through X8 need to be toggled if parallel data D1(t0) through D8(t0) are transmitted as they are, encoded data X1(t0) through X8(t0) are generated by inverting the respective parallel data D1(t0) through D8(t0), and bus inversion signal XBI(t0) is set to "1." Accordingly, since data X1(t0) through X8(0), rather than parallel data D1(0) through D8(0), are transmitted on parallel bus lines 50, at time point t0, parallel bus lines 50 only have three signal toggling, which are data X3, X7, and X8. The total toggled data is thus less than a half of the total number of parallel bus lines 50.

Comparing parallel data D1(t1) through D8(t1) with the respective ones of data X1(t0) through X8(t0), it is observed that signal D1(t1) is toggled over signal X1(t0), while the remaining data D2(t1) through D8(t1) are the same as the respective encoded data X2(t0) through X8(t0), respectively. This indicates that if encoded data X1(t1) through X8(t1) are transmitted without being inverted, only one signal toggling will occur on parallel bus lines 50. Accordingly, encoded data X1(t1) through X8(t1) are kept the same as (without being inverted from) the respective parallel data D1(t1) through D8(t1), and bus inversion signal XBI(t1) may be set to "0." As a result, when encoded data X1(t1) through X8(t1) are transmitted on parallel bus lines 50, only data X1 toggles at time point t1. The total toggled data is again less than a half of the total number of parallel bus lines 50 as in FIG. 1.

Parallel data D1(t2) through D8(t2) are the same as the data X1(t1) through X8(t1). Accordingly, if parallel data D1(t2) through D8(t2) are transmitted without being inverted, none of parallel bus lines 50 as in FIG. 4 will have any data toggling. Accordingly, encoded data X1(t2) through X8(t2) are kept the same as (without being inverted from) the respective encoded data D1(t2) through D8(t2), and bus inversion signal XBI(t2) is set to "0." As a result, at time point t2, no signal toggling occurs on parallel bus lines 50.

Parallel data D1(t3) through D8 (t3) are all inverted from the respective data X1(t2) through X8(t2). Accordingly, if parallel data D1(t3) through D8(t3) are transmitted without being inverted, all of parallel bus lines 50 will have data toggling. Consequently, during clock cycle t3-t4, bus inversion signal XBI(t3) is set to "1," and encoded data X1(t3) through X8(t3) are inverted from the respective parallel data D1(t3) through D8(t3). As a result, even if all eight parallel data D1 through D8 toggle at time point t3, no signal toggling occurs at time point t3 on parallel bus lines 50.

In receiver 40, encoded data X1 through X8 are received from parallel bus lines 50, and are decoded to restore parallel data D1 through D8. The restored data are illustrated in FIG. 4 as restored data Q1 through Q8. In each of the clock cycles t0-t1, t1-t2, t2-t3, t3-t4, bus inversion signal XBI(t0), XBI(t1), XBI(t2), and XBI(t3), respectively, are checked. If the respective bus inversion signal XBI is "0," the respective restored data Q1 through Q8 are kept the same as the corresponding encoded data X1 through X8. Otherwise, if bus inversion signal XBI is "1," each of restored data Q1 through Q8 in the respective clock cycle is inverted from the corresponding encoded data X1 through X8. As a result, restored data Q1 through Q8 are the same as parallel data D1 through D8, respectively.

Figure 5:
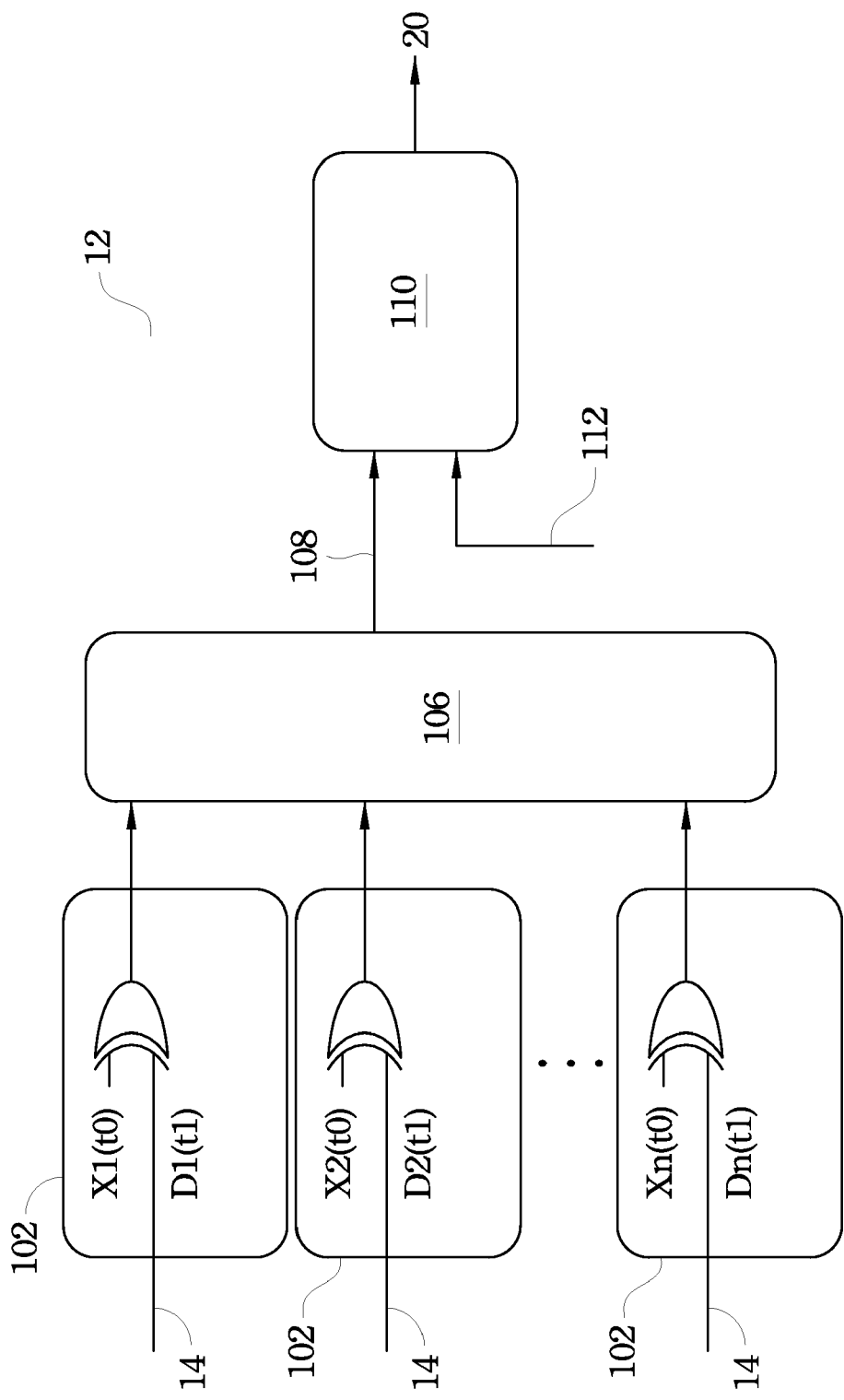
FIG. 5 illustrates a transition monitor circuit in the receiver of the parallel bus system, in accordance with some embodiments.

Referring back to FIG. 1 again, transmitter 10 of the parallel bus system includes transition monitor circuit 12 for generating bus inversion signal XBI as shown in FIGS. 2 through 4. FIG. 5 illustrates an exemplary transition monitor circuit 12, which comprises a plurality of transition (toggling) detectors 102. Each of transition detectors 102 receives one of parallel data D1 through Dn (integer n is 8 in the exemplary embodiment in FIGS. 2 through 4) that are to be transmitted, and compares it with a respective encoded data (for example, X1(t0) through Xn(t0)) in the previous clock cycle. In an exemplary embodiment, each of transition detectors 102 comprises an exclusive-or (XOR) gate, with one input of the XOR gate receiving one of parallel data D1 through Dn, and the other input receiving the encoded data X1 through Xn for the previous clock cycle. If the received data at the two inputs of the same XOR gate are different, a transition is detected. The detection results are outputted to adder 106. Sum 108 generated by adder 106, which is the total number of detected transitions, is provided to comparator 110. Sum 108 indicates the number of parallel bus lines 50 that would have data toggling if input data such as D1(t1) through Dn(t1) are transmitted without being inverted. In an embodiment, comparator 110 compares sum 108 with a pre-determined threshold number 112, which may be, for example, a half (n/2) of the total count n of parallel bus lines 50. If the sum is equal to or less than the threshold number, bus inversion signal XBI is set to "0." Otherwise, if sum 108 is greater than threshold number 112, bus inversion signal XBI is set to "1." It is realized that the threshold number 112 may also be substantially equal to, for example, between about 80 percent and about 120 percent of, n/2.

Referring back to FIG. 1, bus encoder 16 comprises inputs 18 connected to parallel lines 14, which carry parallel data D1 through Dn (with n equal to 8 in the illustrated example), and input 20 coupled to the output of transition monitor circuit 12. Accordingly, bus encoder 16 receives bus inversion signal XBI from input 20. Bus encoder 16 generates encoded data X1 through Xn using input data D1 through Dn and bus inversion signal XBI. In an embodiment, bus encoder 16 comprises a plurality of XOR gates 22, each having a first input for receiving one of parallel data D1 through Dn, and a second input for receiving bus inversion signal XBI. The generated encoded data X1 through Xn are transmitted, for example, to D flip-flops 28 and transmitter I/O 30. Encoded data X1 through Xn and bus inversion signal XBI are then transmitted simultaneously through parallel bus lines 50 to receiver 40. Bus inversion signal XBI is transmitted through parallel bus line 50', which is parallel to, and is separate from, parallel bus lines 50.

Receiver 40 includes receiver I/O 42 and D flip-flops 44. Through receiver I/O 42 and D flip-flops 44, encoded data X1 through Xn are provided to bus decoder 46, which may include a plurality of XOR gates 48. Each of XOR gates 48 has a first input for receiving one of encoded data X1 through Xn, and a second input for receiving bus inversion signal XBI. Through the XOR operation of XOR gates 48, the restored data Q1 through Qn (FIG. 4) outputted to outputs 52 of bus decoder 46 are the same as parallel data D1 through Dn as in FIG. 2.

Through the encoding and decoding of parallel data, the total count of data toggling on parallel bus lines can be reduced to less than a half of the total number of parallel bus lines. On average, the maximum count of signal toggling can be reduced by a half. As a result, the power noise and ground noise are reduced due to the reduced number of data toggling.

In accordance with embodiments, a method includes receiving a first plurality of parallel data; generating a first plurality of encoded data, with each of the first plurality of encoded data same as a respective one of the first plurality of parallel data; and transmitting the first plurality of encoded data simultaneously to a plurality of parallel bus lines, with each of the first plurality of encoded data transmitted by a respective one of the plurality of parallel bus lines. The method further includes receiving a second plurality of parallel data; generating a second plurality of encoded data, with each of the second plurality of encoded data inverted from a respective one of the second plurality of parallel data; and transmitting the second plurality of encoded data simultaneously to the plurality of parallel bus lines, with each of the second plurality of encoded data transmitted by a respective one of the plurality of parallel bus lines.

In accordance with other embodiments, a method includes generating a plurality of encoded data from a plurality of parallel dat. The step of generating the encoded data includes calculating a total count of toggling on a plurality of parallel bus lines for transmitting the plurality of parallel data. When the total count of toggling is equal to or less than a threshold number equal to about a half of a total count of the plurality of parallel bus lines, the plurality of parallel data is kept as the plurality of encoded data. When the total count of toggling is greater than the threshold number, each of the plurality of parallel data is inverted to generate the plurality of encoded data. The method further includes transmitting the plurality of encoded data onto the plurality of parallel bus lines; receiving the plurality of encoded data from the plurality of parallel bus lines; and generating a plurality of restored data identical to the plurality of parallel data from the plurality of encoded data.

In accordance with yet other embodiments, a circuit includes a plurality of parallel bus lines; a transition monitor circuit configured to calculate a total count of toggling on the plurality of parallel bus lines and to output a bus inversion signal in response to the total count; and a bus encoder. The bus encoder is configured to receive a plurality of parallel data simultaneously, and to generate a plurality of encoded data using the plurality of parallel data and the bus inversion signal. The outputs of the bus encoder are coupled to the plurality of parallel bus lines.

Although the embodiments and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A method comprising:
   receiving a first plurality of parallel data;
   generating a first plurality of encoded data, with each of the first plurality of encoded data same as a respective one of the first plurality of parallel data;
   transmitting the first plurality of encoded data simultaneously to a plurality of parallel bus lines, with each of the first plurality of encoded data transmitted by a respective one of the plurality of parallel bus lines;
   receiving a second plurality of parallel data;
   generating a second plurality of encoded data, with each of the second plurality of encoded data inverted from a respective one of the second plurality of parallel data; and
   transmitting the second plurality of encoded data simultaneously to the plurality of parallel bus lines, with each of the second plurality of encoded data transmitted by a respective one of the plurality of parallel bus lines.

2. The method of claim 1, wherein the first and the second plurality of parallel data are in two consecutive clock cycles.

3. The method of claim 1 further comprising:
   generating a first bus inversion signal;
   transmitting the first bus inversion signal along with the first plurality of encoded data;
   generating a second bus inversion signal inverted from the first bus inversion signal; and
   transmitting the second bus inversion signal along with the second plurality of encoded data.

4. The method of claim 3, wherein the first and the second bus inversion signals are transmitted to a bus line parallel to, and separate from, the plurality of parallel bus lines.

5. The method of claim 3, wherein the second plurality of parallel data are in a clock cycle immediately after a clock cycle of the first plurality of parallel data, and wherein the step of generating the second bus inversion signal comprises:
   comparing each of the second plurality of parallel data with a respective one of the first plurality of encoded data to determine a total number of transitions; and
   comparing the total number of transitions with a threshold number, and setting the second bus inversion signal in response to a respective comparison result.

6. The method of claim 5, wherein the step of comparing each of the second plurality of parallel data with the respective one of the first plurality of encoded data comprises using XOR gates to perform comparison, wherein each of the XOR gates comprises a first input receiving one of the second plurality of parallel data, and a second input receiving a respective one of the first plurality of encoded data.

7. The method of claim 5, wherein the threshold number is equal to about a half of a total count of the plurality of parallel bus lines.

8. The method of claim 1 further comprising:
   receiving the first and the second plurality of encoded data from the plurality of parallel bus lines; and
   decoding the first and the second plurality of encoded data to generate a first and a second plurality of restored data, respectively, wherein the first and the second plurality of restored data are the same as the first and the second plurality of parallel data, respectively.

9. The method of claim 8, wherein the step of decoding the first and the second plurality of encoded data comprises performing an exclusive-or operation to each of the first and the second plurality of encoded data and a bus inversion signal.

10. A method comprising:
receiving a plurality of parallel data;
generating a plurality of encoded data from the plurality of parallel data comprising:
  calculating a total count of toggling on a plurality of parallel bus lines;
  keeping the plurality of encoded data the same as the plurality of parallel data when the total count of toggling is equal to or less than a threshold number equal to about a half of a total count of the plurality of parallel bus lines; and
  inverting each of the plurality of parallel data to generate the plurality of encoded data when the total count of toggling is greater than the threshold number;
transmitting the plurality of encoded data through the plurality of parallel bus lines;
generating from the plurality of encoded data a plurality of restored data identical to the plurality of parallel data;
setting a bus inversion signal as true when each of the plurality of encoded data is inverted from a respective one of the plurality of parallel data, and setting the bus inversion signal as false when the plurality of encoded data is the same as the plurality of parallel data; and
transmitting the bus inversion signal from a transmitting end to a receiving end of the plurality of parallel bus lines, wherein the step of generating the plurality of restored data is performed by performing an exclusive-or operation on each of the plurality of encoded data and the bus inversion signal.

11. The method of claim 10, wherein the bus inversion signal is transmitted using a bus line parallel to, and separate from, the plurality of parallel bus lines for transmitting the plurality of encoded data.

12. The method of claim 10, wherein the step of calculating the total count of toggling on the plurality of parallel bus lines comprises comparing each of a plurality of transmitted data with a corresponding one of the plurality of parallel data, wherein the plurality of transmitted data is transmitted through the plurality of parallel bus lines in a clock cycle immediately preceding a clock cycle for transmitting the plurality of encoded data.

13. The method of claim 12, wherein the step of comparing each of the plurality of transmitted data with the corresponding one of the plurality of parallel data is performed by performing exclusive-or operations.

14. The method of claim 10, wherein the steps of keeping the plurality of encoded data the same as the plurality of parallel data and inverting each of the plurality of parallel data to generate the plurality of encoded data are performed using exclusive-or gates.

15. A circuit comprising:
a plurality of parallel bus lines;
a transition monitor circuit configured to, in a first clock cycle, calculate a total count of toggling on the plurality of parallel bus lines, and to output a bus inversion signal in response to the total count; and
a bus encoder configured to, in the first clock cycle:
  receive a plurality of parallel data; and
  generate a first plurality of encoded data based on the plurality of parallel data and the bus inversion signal, wherein outputs of the bus encoder are coupled to the plurality of parallel bus lines, wherein the transition monitor circuit is configured to calculate the total count of toggle by comparing the plurality of parallel data with a second plurality of encoded data, and wherein the second plurality of encoded data is encoded in a second clock cycle immediately before the first clock cycle.

16. The circuit of claim 15 further comprising a bus decoder coupled to the plurality of parallel bus lines and configured to:
receive the first plurality of encoded data from the plurality of parallel bus lines; and
generate a plurality of restored data identical to the plurality of parallel data.

17. The circuit of claim 16 further comprising a bus line parallel to, and separate from, the plurality of parallel bus lines, wherein the bus line comprises a first end coupled to an output of the transition monitor circuit and configured to receive the bus inversion signal, and a second end coupled to the bus decoder.

18. The circuit of claim 16, wherein the bus decoder comprises a plurality of exclusive-or gates, each comprising a first input coupled to a respective one of the plurality of parallel bus lines, and a second input configured to receive the bus inversion signal.

19. The circuit of claim 16, wherein the bus encoder is configured to:
keep the first plurality of encoded data the same as the plurality of parallel data when the total count of toggling is equal to or less than a threshold value equal to about a half of a total count of the plurality of parallel bus lines; and
invert the plurality of parallel data to generate the first plurality of encoded data when the total count of toggling is greater than the threshold value.

* * * * *